US009300157B2

(12) United States Patent
Bergqvist et al.

(10) Patent No.: US 9,300,157 B2
(45) Date of Patent: Mar. 29, 2016

(54) CONTEXT AWARE BATTERY CHARGING

(75) Inventors: Rene Stig Bergqvist, Bjerringbro (DK);
Kimmo Samuel Valo, Turku (FI);
Mikael Johannes Troberg, Salo (FI)

(73) Assignee: Nokia Technologies Oy, Espoo (FI)

( * ) Notice: Subject to any disclaimer, the term of this patent is extended or adjusted under 35 U.S.C. 154(b) by 231 days.

(21) Appl. No.: 13/989,502

(22) PCT Filed: Nov. 25, 2010

(86) PCT No.: PCT/FI2010/050961
§ 371 (c)(1),
(2), (4) Date: Jul. 30, 2013

(87) PCT Pub. No.: WO2012/069690
PCT Pub. Date: May 31, 2012

(65) Prior Publication Data
US 2013/0314054 A1 Nov. 28, 2013

(51) Int. Cl.
H02J 7/04 (2006.01)
H02J 7/00 (2006.01)
H01M 10/44 (2006.01)
H01M 10/48 (2006.01)
B60L 1/00 (2006.01)
H01M 10/052 (2010.01)
H01M 10/42 (2006.01)

(52) U.S. Cl.
CPC ............... *H02J 7/007* (2013.01); *B60L 1/006* (2013.01); *H01M 10/44* (2013.01); *H01M 10/443* (2013.01); *H01M 10/48* (2013.01); *H01M 10/486* (2013.01); *H02J 7/0088* (2013.01); *H02J 7/0091* (2013.01); *H02J 7/045* (2013.01); *H02J 7/047* (2013.01); *H01M 10/052* (2013.01); *H01M 2010/4271* (2013.01); *H01M 2220/30* (2013.01)

(58) Field of Classification Search
CPC ....... H02J 7/0073; H02J 7/0052; H02J 7/007; H02J 7/045; H02J 7/0004; H02J 7/0008; H02J 7/0081; H02J 7/0086; H02J 7/047; H02J 7/0088; H02J 7/0091; H01M 10/44; H01M 10/443; H01M 10/48; H01M 10/486; H01M 2010/4271; H01M 2220/30; Y02E 60/122
USPC ......................... 320/107, 134, 150, 160, 162
See application file for complete search history.

(56) References Cited

U.S. PATENT DOCUMENTS

| 5,864,220 A | 1/1999 | Reipur et al. ................. 320/134 |
| 6,268,715 B1 | 7/2001 | Oglesbee et al. ............. 320/156 |
| 2008/0224667 A1 | 9/2008 | Tanaka et al. ................. 320/139 |
| 2009/0273320 A1* | 11/2009 | Ungar et al. .................. 320/162 |
| 2010/0033124 A1 | 2/2010 | Ngosi et al. ................... 320/101 |

(Continued)

FOREIGN PATENT DOCUMENTS

| CN | 1612436 A | 5/2005 |
| JP | 2002-142378 A | 5/2002 |

*Primary Examiner* — Vuthe Siek
(74) *Attorney, Agent, or Firm* — Harrington & Smith

(57) ABSTRACT

In accordance with an example embodiment of the present invention, there is provided an apparatus including monitoring unit and a charging control unit. The monitoring unit is configured to monitor at least one data acquisition source of a device operated by a rechargeable battery and to estimate a context of the device based on data acquired from the at least one data acquisition source. The charging control unit is configured to dynamically adjust charging voltage and charging current applied to the rechargeable battery based on the estimated context of the device acquired from the monitoring unit. The battery includes at least one battery cell.

16 Claims, 5 Drawing Sheets

(56) References Cited

U.S. PATENT DOCUMENTS

| | | | |
|---|---|---|---|
| 2011/0040996 A1* | 2/2011 | Hackborn | G06F 11/3409 713/340 |
| 2011/0156661 A1* | 6/2011 | Mehta et al. | 320/160 |
| 2011/0298417 A1* | 12/2011 | Stewart et al. | 320/107 |
| 2011/0316548 A1* | 12/2011 | Ghantous et al. | 324/427 |

* cited by examiner (a)

CONTEXT AWARE BATTERY CHARGING

TECHNICAL FIELD

The present application relates generally to an intelligent battery charging technology, more specifically method and apparatus for smartly charging a battery-operated device based at least partially on a context of the device.

BACKGROUND

Lithium-based rechargeable battery is conventionally charged by using Constant- Current, Constant-Voltage (CC-CV) method. The charging voltage rises rapidly to the battery cell upper voltage limit typically 4.2 Vpc (Voltage per Cell), and then maintained at that level. The cell current maintains constant with the rise of charging voltage and starts to decrease when the charging voltage hits the upper level limit. The charging current is cut off when it reaches a predetermined minimum current point which indicates a full charge.

All batteries have a limited lifespan. Charging rate of rechargeable battery has a great impact on length of lifespan of the battery. Fast charging causes increased Joule heating of the cell because of the higher currents involved and the higher temperature in turn causes an increase in the rate of the chemical conversion processes. Frequently fast charging will overstress the battery cells causing them to become weak until they eventually fail and shorten the battery life. The way of charging directly affects the charging rate and further the battery lifetime. In conventional charging process, charging behavior is normally independent of other external parameters than battery type and temperature. Nowadays battery has been widely used in all kinds of battery powered end user devices, for example, portable mobile phone, phone with car kit, camera, laptop etc. Short battery life will cause bad user experience. It is expensive to frequently replace a rechargeable battery.

SUMMARY

Various aspects of examples of the invention are set out in the claims.

According to a first aspect of the present invention, there is provided an apparatus comprising monitoring unit and a charging control unit. The monitoring unit is configured to monitor at least one data acquisition source of a device operated by a rechargeable battery and estimate a context of the device based on data acquired from the at least one data acquisition source. The charging control unit is configured to dynamically adjust charging voltage and charging current applied to the rechargeable battery based on the estimated context of the device acquired from the monitoring unit. The battery comprises at least one battery cell.

According to a second aspect of the present invention, there is provided a method comprising monitoring at least one data acquisition source of a device operated by a rechargeable battery and estimate a context of the device based on data acquired from the at least one data acquisition source; and dynamically adjusting charging voltage and charging current applied to the rechargeable battery based on the estimated context of the device acquired from the monitoring unit. The battery comprises at least one battery cell.

According to a third aspect of the present invention, there is provided an apparatus comprising at least one processor and at least one memory including computer program code. The, at least one, memory and the computer program code are configured to, with the at least one processor, cause the apparatus to perform at least monitoring at least one data acquisition source of a device operated by a rechargeable battery and estimate a context of the device based on data acquired from the at least one data acquisition source, and dynamically adjusting charging voltage and charging current applied to the rechargeable battery based on the estimated context of the device acquired from the monitoring unit. The battery comprises at least one battery cell.

According to fourth aspect of the present invention, there is provided an apparatus comprising means for monitoring at least one data acquisition source of a device operated by a rechargeable battery and estimate a context of the device based on data acquired from the at least one data acquisition source, and means for dynamically adjusting charging voltage and charging current applied to the rechargeable battery based on the estimated context of the device acquired from the monitoring unit. The battery comprise at least one battery cell.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

An example embodiment of the present invention and its potential advantages are understood by referring to FIG. 1 through FIG. 4 of the drawings.

Figure 1:
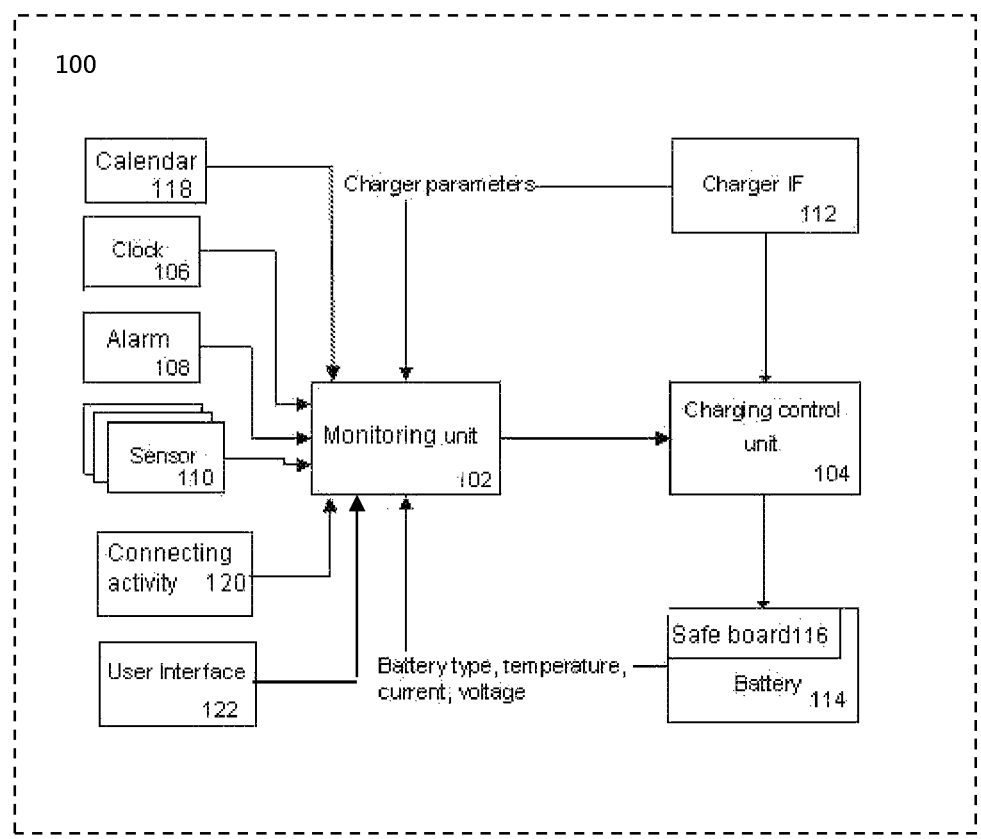
FIG. 1 is an illustration of a device powered by a rechargeable battery comprising an apparatus for context aware charging the rechargeable battery according to an example embodiment.
Figure 2:
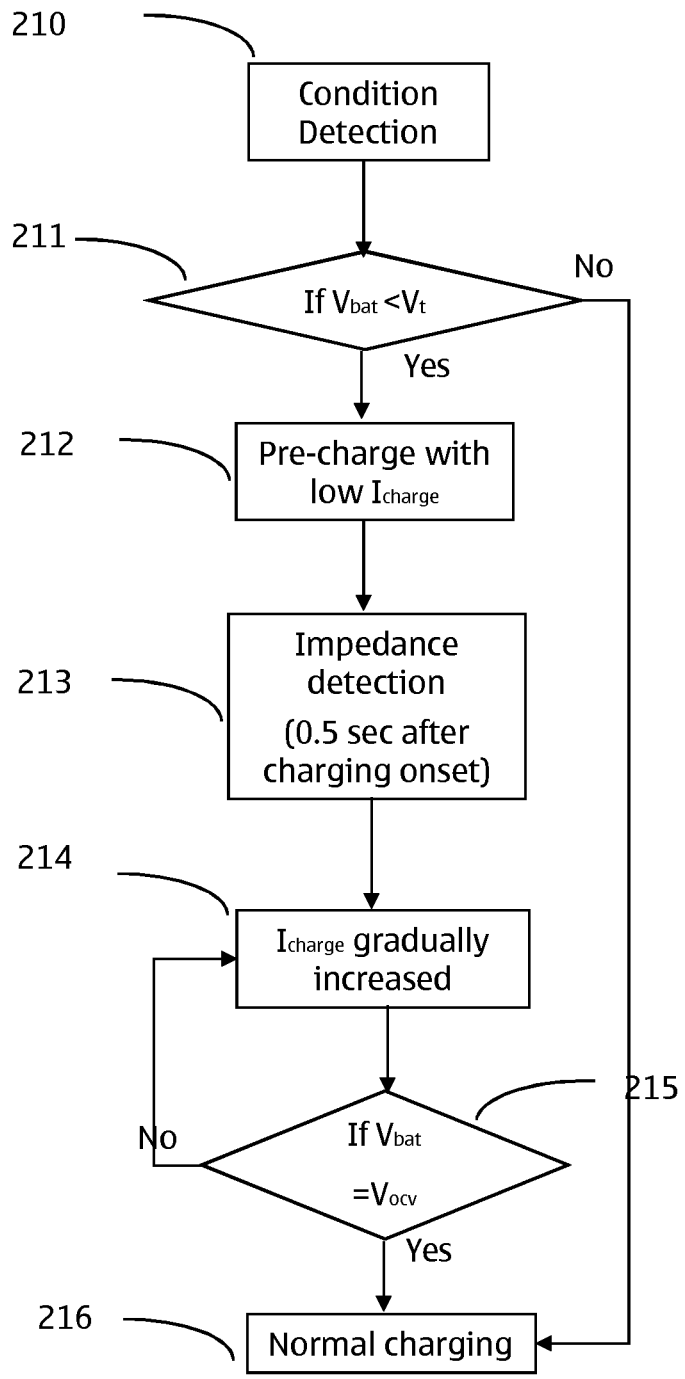
FIG. 2(a) is a flow diagram illustrating a method of conditional charging in terms of battery voltage according to an example embodiment.
FIG. 2(b) is a flow diagram illustrating a method of conditional charging in terms of ambient temperature of battery according to an example embodiment.
Figure 2:
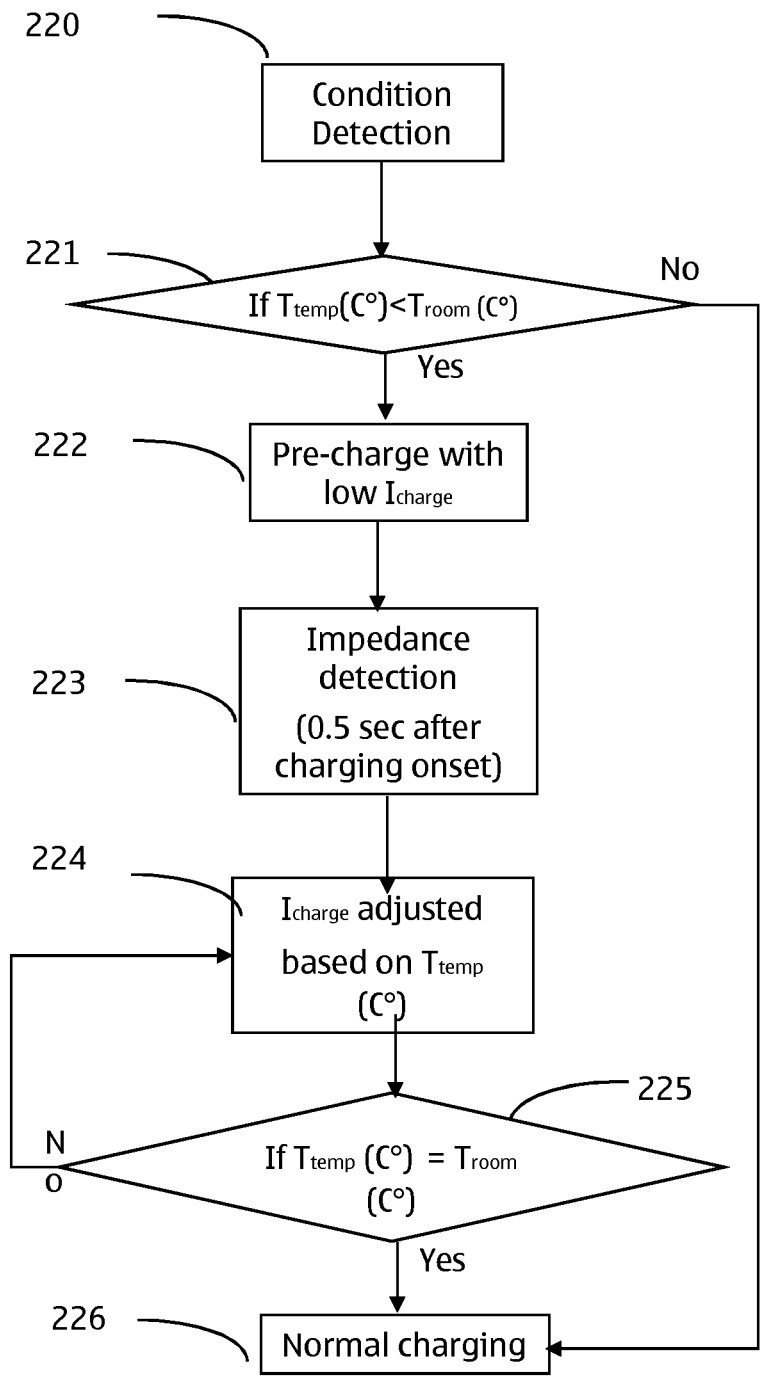

FIG. 1 is an illustration of a device 100 powered by a rechargeable battery 114 (generally called thereafter the battery) comprising an apparatus for context aware charging the battery according to an example embodiment. The device comprises a monitoring unit 102 configured to monitor all parts of the device and the corresponding activities, a charging control unit 104 configured to control charging voltage and charging current from a charger interface (IF) 112 to the battery 114 based on the information acquired from the monitoring unit 102. The charger IF 112 may be in different types, such as a car power charger, a wall plug charger, or micro USB charger for example. For car mode charging, it can be identified by monitoring a motion sensor 110, car connection activity 120 for example, Bluetooth, Wireless Local Area Network (WLAN) or 3$^{rd}$ Generation connection or a car power adapter 112. The unit 102 monitors a clock 106, an alarm 108, at least one sensor 110, a user's calendar 118, a connection activity 120, or a user interface 122 of the device. The monitoring unit 102 may also communicate with charger IF 112 and the battery 114 comprising at least one battery cell, and monitor charging parameters, for example, voltage, current or temperature etc., or identify the type of battery. The battery 114 comprises a safety board 116 configured to monitor charging/discharging of battery and prevent dangerous things from happening based on different secure standards. Obviously, all different secure standards overrule all charging algorithms. The device 100 may be any battery powered device, for example, a laptop, mobile phone, personal assistant device operated by a battery.

FIG. 2(a) is a flow diagram illustrating a method of conditional charging in terms of battery voltage according to an example embodiment. In the example embodiment, the condition of the battery 114 is monitored by the monitoring unit 102 in step 210 when the charger IF 112 is attached to the battery 114. If it is noticed in step 211 that the battery on-load voltage falls below a predetermined threshold voltage $V_t$, for example, battery cut-off voltage (~2.5 V for a lithium-based battery but varies with manufacturers), the battery is over-discharged and is considered of low voltage. The battery is then pre-charged with a low charging current $I_{charge}$ in step 212. For a lithium-based rechargeable battery, charging rate from 0.2 C to 0.7 C is normal accepted to start charging with according to industry standard, where "C" represents the battery capacity/1 hour. For instance, $I_{charge}$=700 mA for a 1000 mAh battery capacity. Even though a higher charging rate 0.7 C is allowed, an over-discharge restoration by fast charging will cause a potential damage to the battery. A pre-charging function is normally preferred. Depending upon the depth of over discharge, the battery capacity may be recovered by a very careful recharging with a low charging current $I_{charge}$. From safety point of view, a pre-charging initiated with a low current is often used for high capacity batteries. If there is no corresponding rise in the battery voltage it indicates that there is possibly a short circuit in the battery. This can be identified by detecting an existence of internal resistance in the battery.

In practice, all real batteries have an internal resistance or impedance $R_{in}$ depending on the battery chemistry used which cannot be avoided. When $I_{charge}$ is applied to a rechargeable battery, the battery voltage is jumped from a no-load floating voltage to a pseudo-voltage contributed by $R_{in}$ only. According to the basic Ohm's law, $$R_{in}=U_{jump}/I_0,$$

wherein $U_{jump}$ is the voltage jump from a no-load floating voltage to a pseudo-voltage contributed only by $R_{in}$ when an initial charging current $I_0$ is supplied. In an example embodiment, the voltage jump could happen 0.5 second after charging onset and the battery internal impedance $R_{in}$ is detected in step 213. If a fast charging is required, the battery voltage increases much faster because of a sudden increase of the charging current so that the effect of $R_{in}$ is overridden. The voltage drop on $R_{in}$ needs to be considered when no charging current is applied on the battery. When $I_{charge}$ reaches to the termination current indicating that the battery is fully charged, the voltage drop is normal very small and may be ignored. The internal resistance $R_{in}$ increases with the age of a battery, but for most battery types ranges from a fraction of an ohm to a few ohms. It is preferable to estimate $R_{in}$ each charging time.

The charge current $I_{charge}$ is then increased to a normal charging rate in step 214, for example, the highest allowable $I_{charge}$ 0.7 C for CC charging process. The battery voltage $V_{bat}$ is also correspondingly increasing with the charging current. When the battery voltage $V_{bat}$ hits the optimal constant voltage $V_{ocv}$ in step 215, a normal CV charging process starts in step 216. For normal CV charging, $V_{ocv}$ is normally less than the upper limit of the voltage per cell, preferably as close to the limit as possible, for example, 4.2 Vpc for lithium-based battery. The charging current then starts to drop until the termination current is reached which indicates the battery is fully charged.

Figure 3:
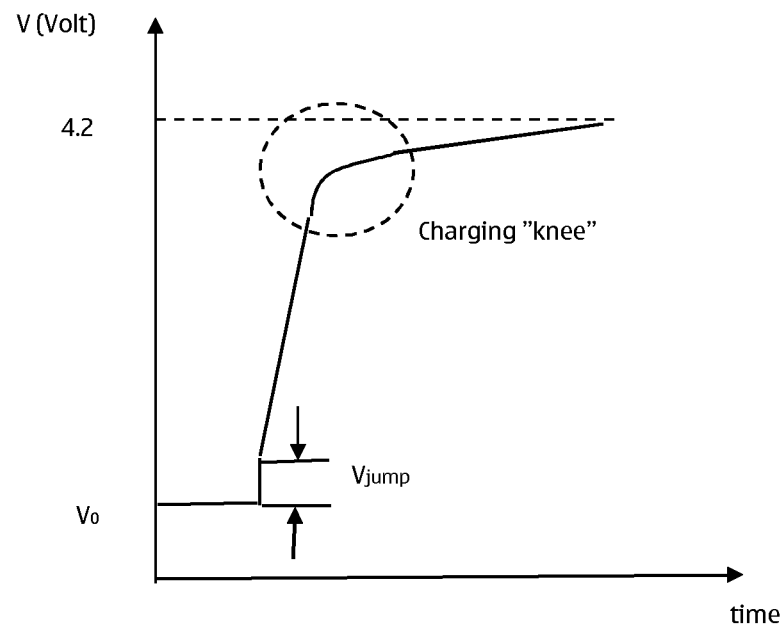
FIG. 3 provides graphical illustration of (a) battery voltage versus time in conventional CC-CV charging, and (b) battery current versus time during the conventional CC-CV charging, according to an example embodiment.
Figure 3:
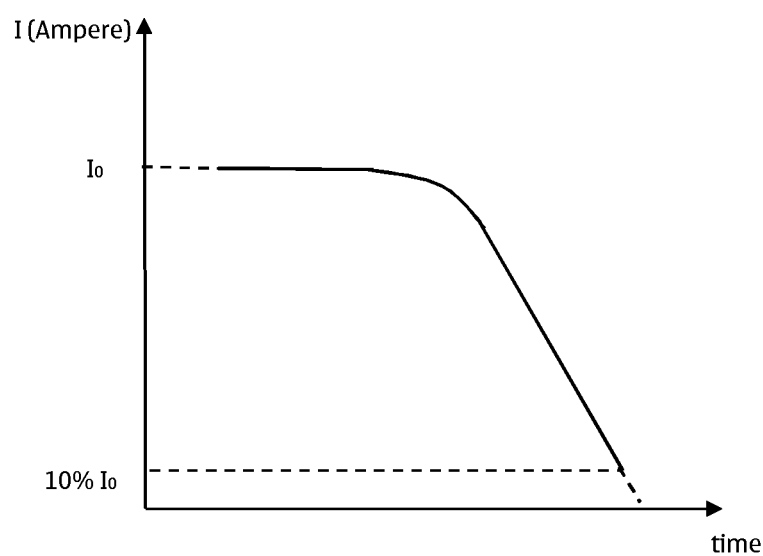

FIG. 3 provides graphical illustration of (a) battery voltage versus time in conventional CC-CV charging and (b) battery current versus time during the conventional CC-CV charging, according to an example embodiment. It is desirable to have a more lenient charging start and more lenient charging "knee". The charging "knee" corresponds to the transient period with high voltage high current as indicated in FIG. 3(a) and has high stress on the battery cell. For lenient charging, instead of increasing the charging current suddenly to a maximum allowable charging current for CC charging, the charging current $I_{charge}$ can be gradually increased in step 214. The optimal constant voltage $V_{ocv}$ is not necessarily as close to the upper limit of the voltage per cell and may be predefined, for example, $V_{ocv}$ is such that the battery is almost 80% charged after the voltage drop on $R_{in}$ is considered for example. For instance, for charging a 3.1 Vpc lithium-based battery with an upper limit of 4.2 Vpc and 0.1 V voltage drop on $R_{in}$, it is 80% charged when the battery voltage per cell is 4.0 V. This way the charging current starts to drop earlier than the conventional CC-CV charging until reaches to the termination current. A lenient charging limits the impact of fast volume expansion or contraction in electrodes, and eliminates combination of high current high voltage otherwise present at charging knee. In addition, lenient charging causes lower ohmic losses that are especially important when local temporary stress phenomena presents in the battery (i.e. local places with higher temperature increases local mechanical expansion versus remaining less expanded material). Lenient charging also allows more smooth transition which prevents local stress breaks (i.e. difference between elastic and plastic deformation). The lenient charging takes a longer time to fully charge a battery compared to the conventional charging. Under the certain circumstances for example user does not need the battery-operated device immediately or it is not necessary that the battery is fully charged, lenient charging prolongs battery's life without loss of user's experience.

FIG. 2(b) is a flow diagram illustrating a method of conditional charging in terms of ambient temperature of battery according to an example embodiment. In the example embodiment, a temperature sensor 110 is monitored in step 220. A high ambient temperature can take a battery beyond its safe operating temperature limits while a low battery temperature reduces charge acceptance even though a full charge is applied to the battery. If it is detected in step 221 that the ambient temperature of the battery $T_{temp}$ is lower than a pre-determined range or value of room temperature (for example between 20° C.-30° C. or at 27° C.), the battery is pre-charged with a low charging current in step 222 before a normal charging starts. A charging process increases Joule heating of the battery because of charging current and internal resistance involved and cause an increase of battery temperature. As indicated before, the internal impedance of the battery $R_{in}$ is able to be measured shortly after the pre-charging starts in step 223. The battery temperature $T_{temp}$ will increase with pre-charging. The charging current $I_{charge}$ is then adjusted based on the change of battery temperature $T_{temp}$ in step 224. If the battery temperature reaches to a normal room temperature in step 225, a normal charging process will starts in step 226. Otherwise, the charging current continuously adjusts itself based on the battery temperature. If the battery temperature is such that the battery has an acceptable charge acceptance in step 221, for example, at room temperature, the normal charging process in step 226 will start immediately. Obviously conditional charging will take longer time than convention charging without considering any real conditions of battery, but battery gets less chemical stress from high charging current and then lifetime prolongs. As wear of the battery is decreased with conditional charging, the internal resistance of the cell will be kept low and the retained capacity will maintain an optimal discharge time over a longer period.

Nowadays, battery charging is normally controlled by voltage, current and temperature. The charging behavior of the conventional CC-CV charging method is independent of other external parameters than battery type and temperature. There may be regulation of charging parameters during charging. However they are fixed (e.g. valid in ranges jumping between levels) and have not taken other conditions than temperature and voltage into account. Even the temperature has a rough adjusting granularity, which does not provide enough accuracy on the regulation of the charging parameters.

From the user's aspect, most of users charge predominantly over night. It is easy to know from a clock 106 when it is night. It is therefore possible to have an extra lenient charging without loss of any user experience. Assuming user does not need the device during night, there is no need to provide full charging rate for over night charging as user experience does not differ whether charging takes 1½ or 6 hours. If battery life-time can be extended that way, it would improve user experience of quality and enhance brand recognition over time. A mechanism to detect user's relevant activity at nighttime may be provided and initializes a faster charging only when it is needed. Charging may also be accelerated in the cases where user is assumed to use charger only a short time. An input from a wakeup alarm clock of the device may be used for a reasonable charging plan and makes sure the battery in the device is fully charged at wakeup time but before that it may have a lower target voltage. It is desirable to adjust charging parameter smartly and improve battery life by making a gentle charging when user is not active.

From one aspect of ambient environment of charging, it is often known where the battery is charged by monitoring such as a motion sensor 110, a car connection activity 120 e.g. Bluetooth connection, or a charger recognizing charging adapter 112 for example. Maintenance charging is normally needed to substantially maintain a full capacity of battery and is triggered when the battery voltage reaches to a particular level. If it is known that the car journey is around 1-2 hours or driving a car is an occupation to the user, it may be beneficial to reduce the maintenance charging triggering voltage or the voltage when the CC charging ends (or the voltage when the CV charging starts).

From another aspect of ambient environment of charging, it is also often known by monitoring a temperature sensor 110 that the temperature of charging environment. Charging is in an extra electrochemical and mechanical stress condition for the battery when the ambient temperature is near 0° C. Charging algorithms today only limit the upper limit of voltage per cell for low temperature charging, but charging current is much more important especially near fully discharged and charged condition. It may not be smart to regulate the charging current in a full step as this would cause increased stress as mentioned above. It is desirable to have an intelligent charging scheme to prolong battery life by adjusting charging parameters gradually without loss of user's experience.

Context aware charging takes into account user's behavior and ambient environment of charging to adjust charging current accordingly. User's behavior may be detected by monitoring different date acquisition units, for example, clock 106, alarm 108, user calendar 118, sensors 110, connection activity 120, etc. A learning algorithm may also be used for adaptation.

Figure 4:
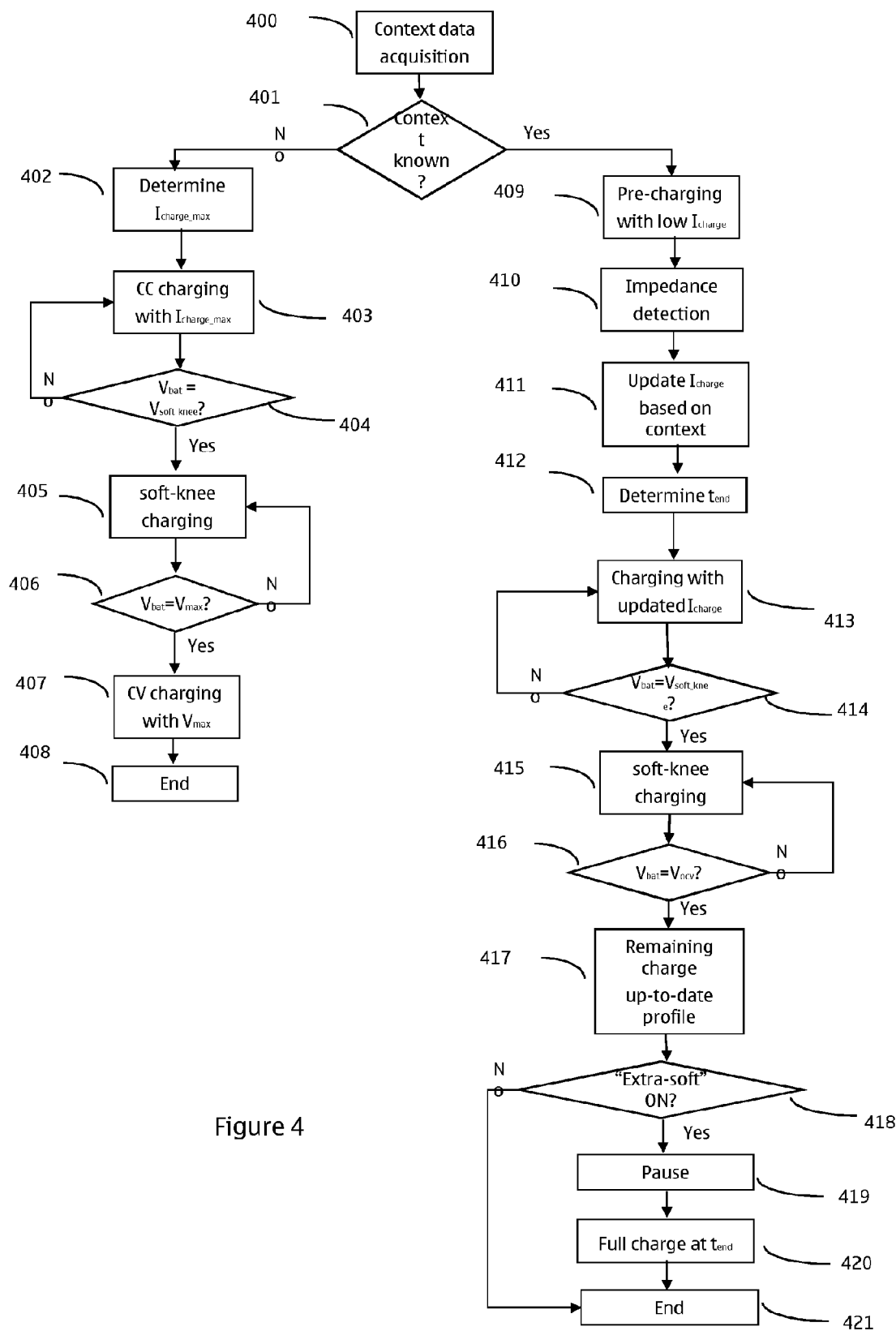
FIG. 4 is a flow diagram showing a method of context aware charging according to an example embodiment.

FIG. 4 is a flow diagram showing a method of context aware charging in compare to that of context unknown charging according to an example embodiment. In step 400, the monitoring unit 102 communicates with different data acquisition units and acquires different information. Without knowing any context about ambient of the battery in step 401, there would be no pre-charging process and the charging current voltage will be regulated to a maximum value. In step 402, a maximum charging current $I_{charge\_max}$ is determined and a CC charging with $I_{charge\_max}$ starts in step 403. Charging with a soft "knee" does not need awareness of ambience. It is desirable to avoid unnecessary high voltage high current occasion as much as possible to reduce the chemical stress on the battery cell during charging. For soft "knee" charging, the voltage is regulated or increased gently until it reaches to the upper limit of battery voltage $V_{max}$ for conventional CV charging or $V_{ocv}$ for lenient charging. How gently the voltage increases may be defined by user. A soft "knee" voltage $V_{soft\_knee}$ in step 404 is a particular voltage triggering a soft "knee" charging in step 405. When $V_{bat}$ reaches to the upper limit of battery voltage $V_{max}$ in step 406, a CV charging starts with a constant $V_{max}$ in step 407 and a reduced charging current to maintain a full energy in the battery until user unplugs charger IF 112 from Charging Control unit 104.

If the device is aware of any information that may affect the regulation of charging parameters, e.g. battery voltage, battery size and type, current time, alarm clock setting, charging mode or environment, user's activity setting in calendar, in step 401, a pre-charging with a low $I_{charge}$ will start in step 409 as described before and the internal impedance of the battery is measured at the initial voltage jump in step 410. The charging current $I_{charge}$ is then updated based on the aware context relating to charging current regulation in step 411. There are many factors that may affect charging current $I_{charge}$ intelligently. According to an example embodiment, charging current is defined by $$I_{charge}=I_{ps}\times F_{cbat}\times F_{temp}\times F_{soc}\times F_{night}\times F_{knee},$$

wherein $I_{ps}$ is the maximum current of power supply from charger IF 112. Five different factors are considered in the determination. Lower temperature increases charging time and reduces charge acceptance. $F_{temp}$ is a factor for correcting the effects from temperature on the charging current, for example, $F_{temp}$ is equal to 0.5 when temperature is at 0° C. or greater than 45° C., 1 at 15-30° C., 0.8 when temperature is greater than 30° C., and 0 when temperature is greater than maximum charging temperature limit (for example 60° C.). $F_{soc}$ is the factor for State of Charge (SOC). The SOC indicates the remaining charge of the battery and is affected by many different reasons, such as temperature or age of the battery. For example, the battery may not necessarily receive a full charge even though it is indicated fully charged at a low temperature; or a fully charging aged cell may have an effective charge capacity of 80%. The SOC also affects charging efficiency so that the charging current needs to be rated accordingly. The factor $F_{soc}$ may be linearly regulated from 0.5 at 3.4V floating voltage (i.e. no-load battery voltage) to 1 at 3.7V floating voltage. This may be overridden if fast charging is requested. $F_{cbat}$ is a correction factor for maximum allowed charging current for battery. For a lithium-based battery with $I_{ps}\times F_{cbat}$=950 mA in maximum, it may not tolerate a higher charge current than 950 mA. Essentially this may be considered where a larger span of batteries could be accommodated, for example 800 mAh to 2000 mAh battery capacities with charging currents of chargers from 400 mA to 1500 mA. The factor of $F_{night}$ takes into account of user's behaviour. If it is noticed from the clock 106 that it is in the middle of the night and the user has no indication of specific plan in the calendar 118, $I_{charge}$ may be adapted if the battery float voltage is greater than 4.0 V by reducing the charging current by half, i.e. $F_{night}=0.5$. $F_{knee}$ is an adaptive factor to smoothen the charging "knee" for lenient charging. Depending on how soft the charging "knee" is, it may be linearly regulated from 1 at 4.0 V to 0.5 at 4.2 for example. Based on the information of $I_{charge}$ and battery capacity BatCap, it is possible to estimate how long it would take to fully charge the battery in step 412, i.e., $t_{end}=BatCap/I_{charge}$. Maintenance charging is a balance between having sufficient energy after full charge and essentially not wearing out the battery heavily. This especially applies for people leaving the device in the charger during day time, for example, for taxi drivers. By using context aware smart charging, the maintenance charging can be adapted or completely avoided so that the battery is not wearing out heavily by long time high voltage high current during maintenance charging.

Context awareness charging continues with the updated $I_{charge}$ in step 413 until the battery voltage reaches to $V_{soft\_knee}$ in step 414 which triggers soft knee charging in step 415. If the battery voltage hits a predefined $V_{ocv}$ in step 416, $I_{charge}$ maintains and CV charge process starts until the battery voltage hits the upper limit in step 417. If there is no need for an extra lenient charging in step 418, the charging process ends in step 421. Otherwise, if it is detected that the battery-operated device 100 is not needed by user based on the up-to-date profile before $t_{end}$ which is still a long time ahead, for example, the user is sleeping or in long-term driving, the charging process will pause in step 419 until shortly before the expected charging process ends. This is to minimize maintenance charge cycles between the pause and restart of charging. The floating voltage of the battery starts to drop after the charging process is terminated due to self-discharge. A normal CC-CV charging process starts and make sure a full charged battery is ready at $t_{end}$ in step 420.

In an example of context aware charging scenario, it is aware that it is a mid of day, a battery with a capacity of 1200 mAh and an upper limit of 4.2 Vpc is in room-temperature, the battery voltage is low and the floating voltage without load is 3.5 V, and the battery will be charged with an AC-10 adapter with a maximum current of power supply 1200 mA. It is defined by the user that $F_{temp}=1$ (for room temperature), $F_{soc}=0.85$, $F_{night}=1$ (because of day time charging), $F_{knee}=1$ (assume this is a normal charging process without soft "knee"). According to the industry standard, a 0.7 C charging rate for CC charging is allowed for a battery with a capacity of 1200 mAh. Therefore, the maximum charge current is $I_{ps} \times F_{cbat}=0.7 \times 1200$ mA, and the allowed charging current is rated by $F_{cbat}=I_{ps} \times F_{cbat}/1200$ which is equal to 0.7 for this case. First onset of charge calculates impedance from the initial voltage increase measured after for example 0.5 seconds, and then $I_{charge}$ is defined as $0.7 \times 1200 \times 1 \times 0.85 \times 1 \times 1 = 714$ mA. The battery voltage increases during CC charging at a constant current of $I_{charge}$ until it hits 4.2 Vpc. Charging with CV starts then until $I_{charge}$ is less than a termination current, e.g. 10% of the maximum charging current, $I_{ps} \times F_{cbat}/10$. Assume soft "knee" charging is defined and $F_{knee}=0.5$, $V_{ocv}=4.2$ Vpc, the charge current is linearly reduced by half (i.e. 357 mA) maintains during CC charging until battery voltage reaches 4.2 Vpc. The charger starts charging the battery at a contact voltage of 4.2 V until the voltage drops to 10% of the initial maximum charging current $I_{ps} \times F_{cbat}/20$ indicating the battery is fully charged.

In another example of context aware charging scenario, assume it is 23:00 in the night, a battery with a capacity of 1500 mAh and an upper limit of 4.2 Vpc in room-temperature is charged by an AC-10 charger with a maximum current of power supply 1200 mA. Before charging the battery is low and the no-load floating voltage is 3.5 V. According to the industry standard, a 0.7 C charging rate is allowed for the battery with a capacity of 1500 mAh. The maximum charging current is determined by $I_{ps} \times F_{cbat}=0.7 \times 1500$. The maximum allowed charged current should be rated by $F_{cbat}=I_{ps} \times F_{cbat}/1200$ which is equal to 0.87 for this case. Moreover, it is defined by the user that $F_{temp}=1$, $F_{soc}=1$, $F_{night}=0.5$ (night time), $F_{knee}=0.5$, $V_{ocv}=4.0$ Vpc (battery is 80% charged) for soft "knee" charging. First onset of charge calculates impedance from the initial voltage increase measured after 0.5 seconds. The charging rate is determined by $0.87 \times 1200 \times 1 \times 1 \times 1 \times 0.5 = 522$ mA. CC charging with $I_{charge}=522$ mA starts until the battery voltage reaches to 4.0 Vpc, and then charging pauses because the user does not intend to use the device 100 within a short time, for example, the user is sleeping. Just before the user wakes up, continue charge the battery with $I_{charge}$ until the battery voltage hits 4.2 Vpc. The battery continues to be charged by CV with $I_{charge}$ dropping until the current has been dropped to 10% of the initial maximum charging current which is $I_{ps} \times F_{cbat}/20$. As a rule of thumb, for the battery defined above and being halfway charged to 3.8V, the charging completion would likely take around 2 hours.

In some example embodiments, user may also indicate through user interface 122 when the device under charging is expected to be fully charged or which type of charging the user prefers, such as normal charging, conditional charging, lenient charging, context aware charging, or fast charging for example.

Without in any way limiting the scope, interpretation, or application of the claims appearing below, a technical effect of one or more of the example embodiments disclosed herein is to get a better user experience by providing best possible compromise between battery life and energy available. Another technical effect of one or more of the example embodiments disclosed herein is to allow adaptive trickle charging or avoid trickle charging completely with a context aware charging. Another technical effect of one or more of the example embodiments disclosed herein is that user will always have a full battery in the morning or when it is needed along with other power management initiatives using night awareness to reduce power consumption.

Embodiments of the present invention may be implemented in software, hardware, application logic or a combination of software, hardware and application logic. The software, application logic and/or hardware may reside in the battery-operated device. If desired, part of the software, application logic and/or hardware may reside on a wireless network service. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted in FIG. 1. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. An apparatus, comprising:
    a monitoring unit configured to monitor at least one data acquisition source of a device operated by a rechargeable battery and estimate a context of the device based on data acquired from the at least one data acquisition source, wherein the context of the device comprises a user's activity predictive of when the user may be actively using the device;
    a charging control unit configured to dynamically adjust charging voltage and charging current applied to the rechargeable battery based on the estimated context of the device acquired from the monitoring unit,
    wherein the rechargeable battery comprises at least one battery cell.

2. The apparatus of claim 1, wherein the charging control unit is further configured to determine the end of expected charging period.

3. The apparatus of claim 2, wherein the rechargeable battery is fully charged at the end of expected charging period.

4. The apparatus of claim 1, wherein the context of the device comprises temperature and remaining voltage of the rechargeable battery.

5. The apparatus of claim 1, wherein the context of the device comprises a charging environment of the rechargeable battery.

6. An apparatus of claim 1, wherein the rechargeable battery is charged by a charging process comprising a constant current (CC) charging process and a constant voltage (CV) charging process.

7. An apparatus of claim 6, wherein the CC charging process comprises a maximum charging voltage, and the charging control unit is further configured to determine the maximum charging voltage based at least on the internal impedance of the battery and the constant charging current.

8. An apparatus of claim 7, wherein the maximum charging voltage is such that the battery is partially charged based on a predefined factor.

9. An apparatus of claim 6, wherein the charging process further comprising a pause when the expected charging period is longer than the charging period by a normal CC-CV charging process, wherein the constant current of the normal CC charging process is substantially equal to a predetermined highest allowable charging current, and the constant charging voltage of the normal CV charging process is substantially equal to a predetermined upper limit voltage of the at least one rechargeable battery cell.

10. An apparatus of claim 1, wherein the at least one data acquisition source comprising partially at least an alarm, a clock, a sensor, a user calendar, a user interface, or a connection activity.

11. An apparatus of claim 1, wherein the battery is a lithium-based battery.

12. An apparatus of claim 1 comprising a mobile device.

13. An apparatus, comprising:
    at least one processor; and
    at least one memory including computer program code;
    wherein the at least one memory and the computer program code are configured to, with the at least one processor, cause the apparatus to perform at least the following:
    monitoring by a monitoring unit at least one data acquisition source of a device operated by a rechargeable battery and estimate a context of the device based on data acquired from the at least one data acquisition source, wherein the context of the device comprises a user's activity predictive of when the user may be actively using the device;
    dynamically adjusting by a control unit charging voltage and charging current applied to the rechargeable battery based on the estimated context of the device acquired from the monitoring unit, wherein the rechargeable battery comprises at least one battery cell.

14. A computer program product embodied in a non-transitory computer memory and comprising instructions the execution of which by a processor results in performing operations that comprise:
    monitoring by a monitoring unit at least one data acquisition source of a device operated by a rechargeable battery and estimate a context of the device based on the data acquired from the at least one data acquisition source, wherein the context of the device comprises a user's activity predictive of when the user may be actively using the device; and
    dynamically adjusting by a control unit charging voltage and charging current applied to the rechargeable battery based on the estimated context of the device acquired from the monitoring unit,
    wherein the rechargeable battery comprises at least one battery cell.

15. A computer program product according to claim 14, wherein the charge control unit is further configured to determine an end of expected charging period and the rechargeable battery is fully charged at the end of expected charging period.

16. A computer program product according to claim 14, wherein the context of the device comprises partially at least one of temperature, remaining voltage, the charging environment of the rechargeable battery, and the user's activity.

\* \* \* \* \*